US005537956A

United States Patent [19]
Rennfeld et al.

[11] Patent Number: 5,537,956
[45] Date of Patent: Jul. 23, 1996

[54] COOLANT CIRCUIT

[75] Inventors: Alfons Rennfeld, Stuttgart; Jürgen Friedrich; Karl-Ernst Noreikat, both of Esslingen, all of Germany

[73] Assignee: Daimler-Benz AG, Stuttgart, Germany

[21] Appl. No.: 289,015

[22] Filed: Aug. 11, 1994

[30] Foreign Application Priority Data

Aug. 13, 1993 [DE] Germany .......................... 43 27 261.4

[51] Int. Cl.⁶ .................................................... F01P 3/00
[52] U.S. Cl. .................... 123/41.29; 123/41.31; 237/12.3 A; 180/65.1; 310/54; 310/58
[58] Field of Search ............................. 123/41.29, 41.31; 237/12.3 A; 310/54, 58; 180/65.1

[56] References Cited

U.S. PATENT DOCUMENTS 4,951,871  8/1990  Hata et al. ................... 237/12.3 A

FOREIGN PATENT DOCUMENTS 931087   7/1963   Brazil .
0275720  7/1988   European Pat. Off. .
0295629  12/1988  European Pat. Off. .
3738412  5/1989   Germany .
4125768  2/1993   Germany .
9302884  2/1993   WIPO .

Primary Examiner—Noah P. Kamen
Attorney, Agent, or Firm—Klaus J. Bach

[57] ABSTRACT

In an arrangement for the cooling of vehicle components comprising a first coolant circuit including a first component to be cooled, a radiator with cooling fan and a coolant pump for circulating coolant through the first component and the radiator, a by-pass line arranged in parallel flow relationship with the radiator and including a second heat exchanger with a fan for providing heated air for the passenger compartment of the vehicle and a control valve for controlling the flow of coolant through the by-pass line and the second heat exchanger, there is provided a second coolant circuit which extends also through the second heat exchanger separately from the first coolant circuit and includes an additional component to be cooled.

8 Claims, 1 Drawing Sheet

COOLANT CIRCUIT

BACKGROUND OF THE INVENTION

The invention relates to an arrangement for the cooling of vehicle components with a cooling circuit which includes a first heat exchanger with a control unit for controlling a coolant pump and a cooling fan for the first heat exchanger and a second heat exchanger usable as a heater and arranged in a parallel circuit including a valve for controlling the coolant flow in the parallel circuit and a second fan for blowing air through the second heat exchanger for heating the vehicle.

DE-OS 37 38 412 describes an arrangement for cooling a motor with a coolant circuit including a first heat exchanger provided with a fan. The output of the fan and of a coolant pump arranged in the coolant circuit is controlled by a control apparatus depending on the operating temperatures. A second heat exchanger whose available heat can be utilized for heating purposes is arranged in a by-pass circuit which is arranged in parallel with the first heat exchanger and includes a shut-off valve for isolating the second heat exchanger.

The object of the present invention is to provide a cooling arrangement for two vehicle components operating at different coolant temperature levels and, at the same time, to provide optimal heating capabilities for the passenger compartment of the vehicle.

SUMMARY OF THE INVENTION

An arrangement for the cooling of vehicle components comprises a first coolant circuit including a first component to be cooled, a radiator with cooling fan and a coolant pump for circulating coolant through the first component and the radiator. A by-pass line, arranged in parallel flow relationship with the radiator, includes a second heat exchanger with a fan for providing heated air for the passenger compartment of the vehicle. A control valve controls the flow of coolant through the by-pass line and the second heat exchanger. A second coolant circuit extends also through the second heat exchanger separately from the first coolant circuit and includes an additional component to be cooled.

The two cooling circuits are coupled by way of a common heat exchanger whose available heat can be utilized for heating the passenger compartment of the vehicle. This has the advantage that, with the valve closed, both coolant circuits are fully separated from one another whereby only the second coolant circuit is operative for heating the passenger compartment. With the valve open, both coolant circuits are operative for heating of the passenger compartment.

DESCRIPTION OF THE PREFERRED EMBODIMENTS

Figure 1:
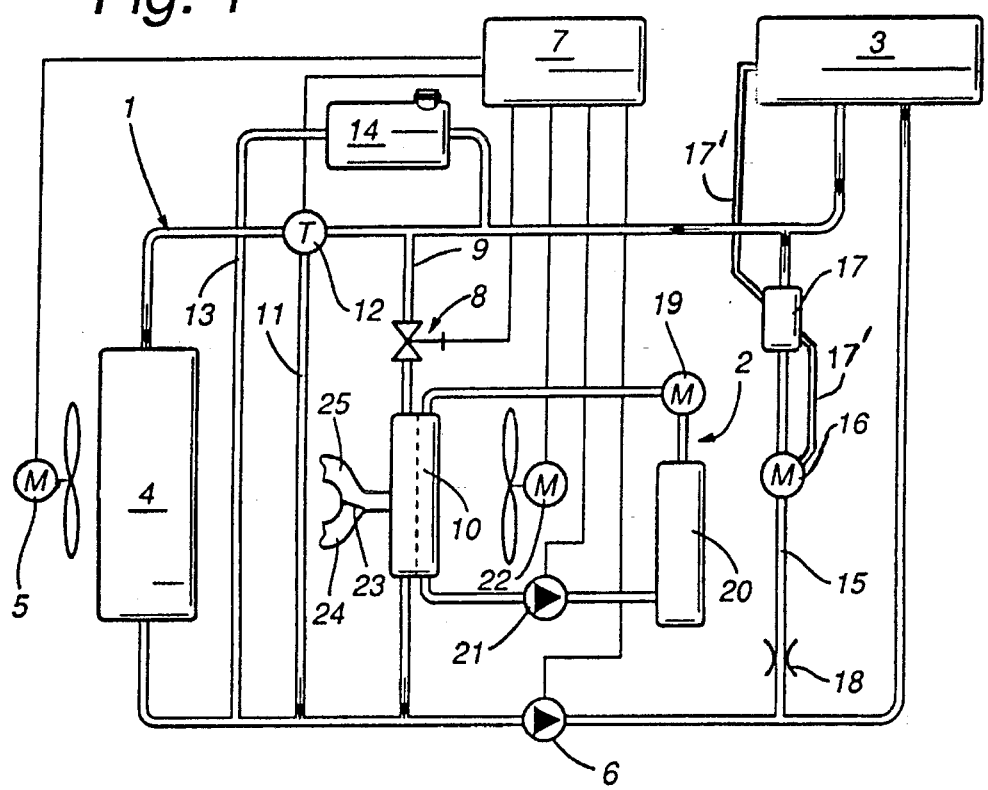
FIG. 1 shows one embodiment of a cooling circuit arrangement according to the invention.
Figure 2:
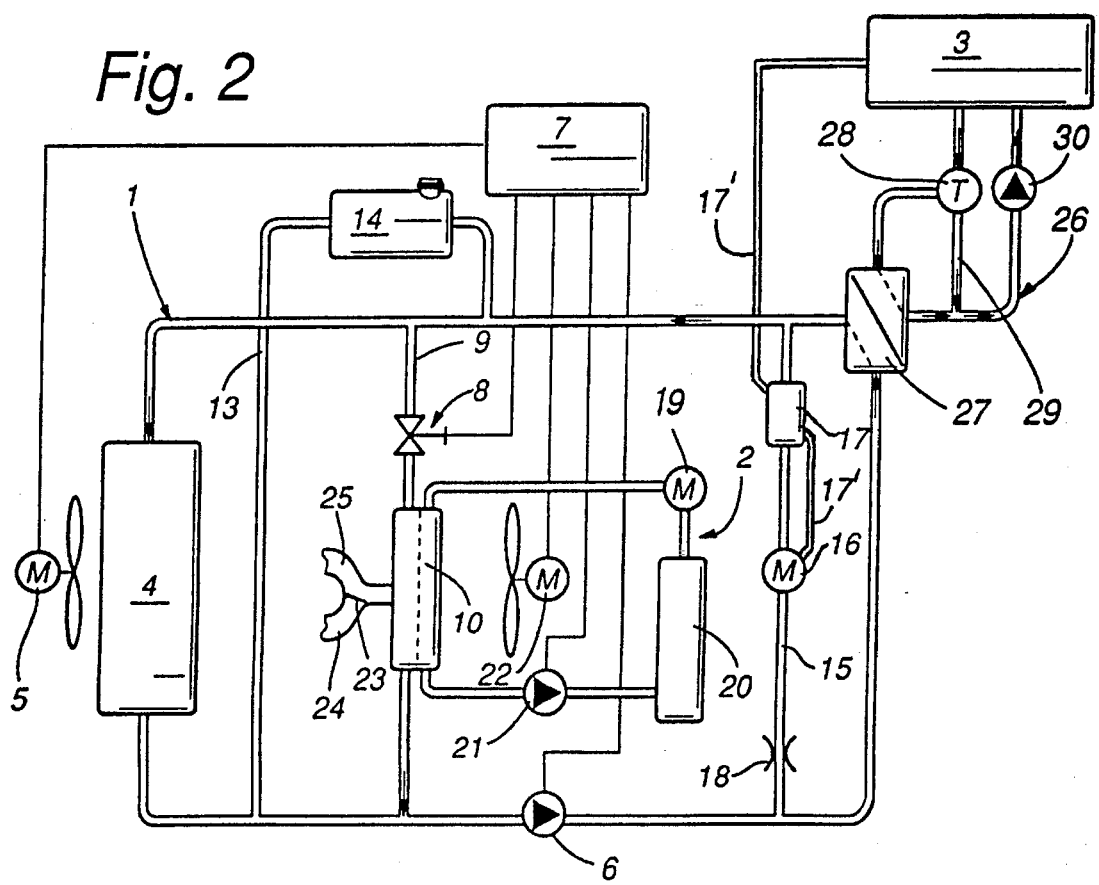
FIG. 2 shows another embodiment of the arrangement according to the invention.

FIGS. 1 and 2, in which for the same components the same reference numerals are used, show vehicle cooling arrangements with two coolant circuits 1, 2. The first coolant circuit 1 includes a first component to be cooled such as a fuel cell unit 3 and a first heat exchanger 4 serving as a radiator for the first component. In addition, the first coolant circuit 1 includes a coolant pump 6 which, like an associated cooling fan 5, can be controlled by a control unit 7 dependent on various operating parameters.

Parallel to the radiator 4, there is a first by-pass line 9 which includes a second heat exchanger 10 and a control valve 8 for controlling the coolant flow through the second heat exchanger. The first coolant circuit 1 further includes a second by-pass line 11 (FIG. 1) which is in communication with the first coolant circuit via a thermo valve 12 arranged in the first coolant circuit upstream of the radiator 4. With this valve, the coolant flow can be directed to the radiator 4 or through the second by-pass line 11 depending on the setting of the thermo valve 12. There is further a third by-pass line 13 with an integral expansion container 14 with which the coolant level in the first coolant circuit can be controlled. As shown in FIG. 1, the by-pass line 13 is connected to the first coolant circuit 1 upstream of the first and second by-pass lines 9, 11. The expansion container 14 is always in communication with the first coolant circuit independent of the setting of the valves 8, 12.

A fourth by-pass line 15 is arranged in parallel flow relationship with the fuel cell unit 3 and includes further components to be cooled such as a water-cooled compressor drive unit 16 and a fuel cell air cooler 17. The compressor is used to control the air flow through supply line 17' to the fuel cell unit 3. The air compressed by the compressor and conducted to the fuel cell is cooled in the fuel cell air cooler before being admitted to the fuel cell unit. The coolant flow through the fourth by-pass line can be controlled to the desired flow level by a throttling member 18.

The second cooling circuit 2 includes further components to be cooled such as an electric drive motor 19 with associated power controller 20. The second coolant circuit 2 includes a second coolant pump 21 and is coupled to the second heat exchanger 10. A second cooling fan 22 supplies fresh air to the second heat exchanger 10. The fresh air passes through the second heat exchanger 10 and is heated therein. It can then be supplied, by means of a flap arrangement 23, to the passenger compartment through a heating duct 25 or it can be discharged to the environment through a discharge duct 24 depending on the heating requirements.

The control unit 7 is connected to the valves 8, 12, the fans 5, 22 and the coolant pumps 6, 21 by way of electrical wiring. The control unit can control the position of the valves 8, 12 or the power supply to the fans 5, 22 and the coolant pumps 6, 21 depending on vehicle or operating parameters. For example, during initial vehicle operation, the thermo valve 12 is held closed until the first coolant circuit has reached a predetermined temperature. In the closed position of the thermo valve, no coolant can flow through the radiator 4, but all the coolant flows through the by-pass line 11 allowing the fuel cell unit to reach its operating temperature as rapidly as possible. Then the control unit controls the temperature of the fuel cell apparatus 3 by controlling the position of the thermo valve 12 and/or the valve 8. It is, of course, possible to use a mechanical thermo valve, for example, a thermostatic control valve.

When the valve 8 is closed, both coolant circuits 1, 2, normally operating at different temperature levels, are totally uncoupled. Then the first coolant circuit 1, which has the higher temperature level, is cooled exclusively by the radiator 4. The heat generated by the electric drive motor 19 and the associated power controller 20 is eliminated solely by way of the heat exchanger 10. The valve 8 is closed by the control unit 7 whenever the cooling capacity of the radiator 4 alone is sufficient for the first coolant circuit 1 and the heating requirements do not exceed the heat available from the second coolant circuit 2.

When the valve 8 is opened, the coolant of both coolant circuits 1,2, flows through the heat exchanger 10. However, there is no flow communication between the two coolant circuits 1, 2. The valve 8 is opened when the cooling capacity of the radiator 4 is insufficient for removing the heat generated in the first coolant circuit 1 or when the heating requirements for the passenger compartment exceed the amount of heat generated in the second coolant circuit 2. The first situation occurs when the fuel cell unit is operated under high load. When the electric drive motor 19 idles, additional heat may be needed during cool weather periods. The coolant of the first coolant circuit is then conducted partly through the radiator 4 and partly through the heat exchanger 10.

FIG. 2 shows another embodiment. It is noted that the same components are designated in FIG. 2 by the same reference numerals as is in FIG. 1. In contrast to the arrangement shown in FIG. 1, the fuel cell unit 3 is not integrated into the first coolant circuit but is coupled to the first coolant circuit by way of a third coolant circuit 2 with a liquid-to-liquid heat exchanger 27. Parallel to the heat exchanger 27, the third coolant circuit includes a fourth bypass line 29 with a thermo valve 28 for controlling the coolant flow through the by-pass line 29. With this arrangement, proper fuel cell operation temperature can be maintained by means of the thermo valve 28 and the fourth by-pass line 29. There is no need for the thermo valve 12 and the by-pass line as shown in FIG. 1 and they have therefore been omitted in FIG. 2. However, the third coolant circuit 26 includes an additional coolant pump 30 which may also be controlled by the control unit 7. In this arrangement, the third coolant circuit 26 may be operated with purified water whereas the first and second coolant circuits 1, 2 can be operated with tap water. Utilizing highly purified water in the third coolant circuit eliminates, or at least minimizes, contamination in the fuel cell unit 3.

In the arrangements described, additional components may be integrated into the coolant circuits or further coolant circuits may be coupled to the coolant circuits as shown and described herein.

What is claimed is:

1. An arrangement for the cooling of components of a vehicle comprising: a first coolant circuit with a first component to be cooled, a first heat exchanger with a cooling fan for blowing cooling air through said first heat exchanger, a coolant pump for circulating the coolant, a by-pass line arranged in parallel flow relationship with said first heat exchanger and including a second heat exchanger with a second cooling fan for blowing air through said second heat exchanger for heating said air, a control valve for controlling the flow of coolant through said by-pass line, a second coolant circuit also extending through said second heat exchanger in separate flow relationship from said first coolant circuit and including at least one additional component to be cooled and a control unit for controlling operation of said coolant pump, said cooling fans and said control valve, depending on operating parameters of the vehicle by sensors connected to said control unit.

2. An arrangement according to claim 1, wherein said second coolant circuit includes a second coolant pump.

3. An arrangement according to claim 1, wherein the output of said second coolant pump and said second fan are controllable by said control unit depending on operating parameters.

4. An arrangement according to claim 1, wherein means are provided for selectively supplying the air heated in said second heat exchanger to a passenger compartment in said vehicle for heating the passenger compartment or discharging the heated air to the environment.

5. An arrangement according to claim 1, wherein said first component to be cooled is a fuel cell unit.

6. An arrangement according to claim 5, wherein said first coolant circuit includes a parallel line which is arranged in parallel with said first component to be cooled and which includes a compressor drive unit for supplying compressed air to said fuel cell unit and a third heat exchanger for cooling the compressed air before it is supplied to the fuel cell unit.

7. An arrangement according to claim 1, wherein said first component to be cooled is a liquid-to-liquid heat exchanger which is a part of a third coolant circuit in which a fuel cell unit is arranged and through which heat generated in said fuel cell unit is transferred to said first coolant circuit.

8. An arrangement according to claim 1, wherein said second coolant circuit includes a coolant passage which cools an electric vehicle drive motor and a and a motor controller connected to the drive motor.

* * * * *